(12) United States Patent
Mekuria et al.

(10) Patent No.: US 6,876,965 B2
(45) Date of Patent: Apr. 5, 2005

(54) REDUCED COMPLEXITY VOICE ACTIVITY DETECTOR

(75) Inventors: Fisseha Mekuria, Lund (SE); Joakim Persson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 358 days.

(21) Appl. No.: 09/796,383

(22) Filed: Feb. 28, 2001

(65) Prior Publication Data

US 2002/0147580 A1 Oct. 10, 2002

(51) Int. Cl.$^7$ .............................................. G10L 19/02
(52) U.S. Cl. ....................................... 704/207; 704/211
(58) Field of Search ................................. 704/207, 211

(56) References Cited

U.S. PATENT DOCUMENTS

| | | | |
|---|---|---|---|
| 5,195,138 A | 3/1993 | Kane et al. | 381/46 |
| 5,548,680 A | 8/1996 | Cellario | 395/2.28 |
| 5,649,055 A | 7/1997 | Gupta et al. | 395/2.42 |
| 5,970,441 A | 10/1999 | Mekuria | 704/207 |
| 5,991,718 A | 11/1999 | Malah | 704/233 |
| 6,006,176 A | 12/1999 | Hayata | 704/214 |
| 6,023,674 A | 2/2000 | Mekuria | 704/233 |

FOREIGN PATENT DOCUMENTS

| | | |
|---|---|---|
| DE | 334 023 | 9/1989 |
| WO | WO 00/17856 | 3/2000 |
| WO | WO 00/33296 | 6/2000 |
| WO | WO 00/70602 | 11/2000 |

OTHER PUBLICATIONS

Cosi, et al., "Auditory modeling techniques for robust pitch extraction and noise reduction", XP–002175877, dated Nov. 30, 1998.
Alkulaibi, et al., "Fast 3–level binary higher order statistics for simultaneous voiced/unvoiced and pitch detection of a speech signal", XP–4102257A, dated Dec. 1, 1997, pp. 133–140.
Brandel and Johannisson, "Speech Enhancement by Speech Rate Conversion", Master of Science Thesis, University of Karlskrona/Ronneby, XP–002169594, dated Aug. 1999, Chapters 4, 5 and 8.
EPO Standard Search Report, RS 106653 US, dated Sep. 4, 2001.

*Primary Examiner*—Susan McFadden
*Assistant Examiner*—Michael N. Opsasnick
(74) *Attorney, Agent, or Firm*—Jenkens & Gilchrist, P.C.

(57) ABSTRACT

A voice activity detector is disclosed for use with a radio transmitter to continuously sense the presence of speech in an audio signal. Initially, the audio signal is processed to produce a train of signal samples. Signal peaks are identified therefrom, which are used to compute respective values for a succession of quasi-pitch periods associated with the signal sample train. The quasi-pitch period values are then selectively compared with one another, in order to determine the presence or absence of a speech component.

14 Claims, 2 Drawing Sheets

REDUCED COMPLEXITY VOICE ACTIVITY DETECTOR

BACKGROUND OF THE INVENTION

The invention disclosed and claimed herein generally pertains to voice activity detection in a communication system. More particularly, the invention pertains to a voice activity detector which is of reduced complexity and does not require a multiplier. Even more particularly, the invention pertains to a voice activity detector for use with a transmitter disposed to transmit audio signals through an air interface, wherein transmissions are to be discontinued whenever speech is absent from the signal.

There is increasing interest in providing mobile phones and other small electronic devices with the capability to connect and communicate wirelessly, over short ranges, with one another. Such capability would eliminate or substantially reduce the need for cables between devices such as phones, PC cards, headsets and laptop computers. Moreover, a number of such devices could thereby be joined together, very readily, to form small networks. As an example of this interest, the assignee herein, a major supplier of mobile telecommunication equipment and systems, has initiated a program known as the Bluetooth air interface to develop wireless communication capability of the above type.

In interconnecting small devices over a short range air interface, it is very important to limit costs, and also to reduce overall interference levels on the interface. Accordingly, in an air interface such as the Bluetooth interface, a transmitter disposed to receive speech is provided with a discontinuous transmission (DTX) capability, which causes the transmitter to be switched off during speech pauses. Such capability reduces cost, by minimizing transmitter power requirements, and also reduces signal interference level. However, the discontinuous transmission functionality requires a Voice Activity Detector (VAD) to continually determine whether or not an audio signal, applied or inputted to the transmitter, contains a speech component In the past, VAD dectectors could require voice or speech coders. As disclosed, for example, by U.S. Pat. No. 6,023,674, issued to one of the inventors herein, such coders may be very complex. Prior art VAD detectors could also require multiplier devices, as disclosed by U.S. Pat. No. 5,970,441, likewise issued to one of the inventors herein. It would be very desirable to provide a VAD for an air interface of the above type which is of substantially reduced complexity, and which does not need either a multiplier or a voice coder of the type described in the prior art.

SUMMARY OF THE INVENTION

In order to achieve the above objectives, the present invention discloses a VAD concept which is based on speech signal properties and on parameters extracted from a wave form disposed to carry the speech signal. In one embodiment, the invention is directed to a method for detecting the presence or absence of a speech component in an audio signal. Such method generally comprises the steps of processing the audio signal to produce a train of signal samples, and computing respective values of a succession of quasi-pitch (Q_Pitch) periods associated with the train of samples. The method further comprises the step of comparing the values of selected Q_Pitch periods with one another, to determine whether or not a speech component is present in the audio signal.

In a preferred embodiment of the invention, the comparing step comprises determining whether or not successive Q_Pitch periods have similar values, or lengths, over a number of frames. It has been recognized that if the Q_Pitch periods over a group of adjacent frames indeed do have similar values, this provides an indication of a sustained pitch, as contained in a voice signal. In accordance with the invention, such determination may be made by comparing respective values of a specified number of adjacent Q_Pitch periods, and concluding that a speech component is present if all of the values of the compared Q_Pitch periods are the same, to within a specified limit or narrow range of values.

Preferably also, as described herein in further detail, respective Q_Pitch period values are computed by identifying signal peaks in respective frames in a succession of frames, and then calculating the spacings between peaks. In order to reduce the amount of samples needed for the method, as well as to simplify the required signal processing, initial processing of the audio signal includes application of an absolute value function or half-wave rectification to the incoming audio signal.

DETAILED DESCRIPTION OF THE PREFERRED EMBODIMENT

Figure 1:
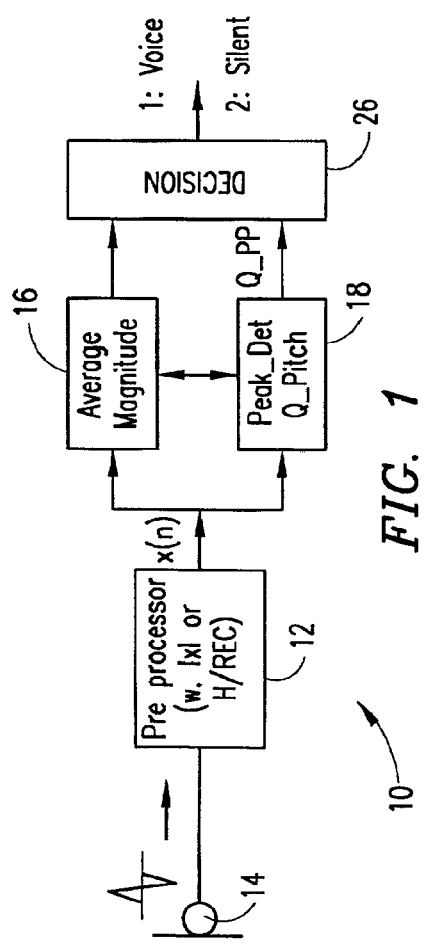
FIG. 1 is a block diagram illustrating an embodiment of the invention.

Referring to FIG. 1, there is shown a voice detector (VAD) 10 constructed in accordance with the invention. Detector 10 includes a preprocessing component 12 which receives an audio frequency signal s(n) having a voice component from a microphone 14 or other source. Preprocessor 12 samples the audio signal to provide a stream or train of signal samples x(n) Preferably, preprocessor 14 includes an absolute value function |X| or a half-way rectifier (HREC) to reduce the number of samples needed to represent the signal, thereby simplifying subsequent signal processing.

Referring further to FIG. 1, there is shown a component or function block 16 which is disposed to receive the samples x(n) and to compute the average magnitude $\overline{X}$ thereof. More particularly, successive samples x(n) are grouped in sets of frames, each having a length M. Function block 16 computes the average magnitude of the respective M samples in each frame, using the following equation:

$$\overline{X} = \frac{1}{M}\sum_{n=1}^{M} |x(n)| \qquad \text{Eqn. (1)}$$

For instance, if Bluetooth is the target system, then a frame length M can be taken to be 2×3.75 ms period length (2×HV3 packet length). HV3 pertains to high quality voice packets utilizing the synchronous communication link (SCO) in the specification of the Bluetooth voice interface, referred to above, and has a packet period of 3.75 milliseconds.

Figure 2:
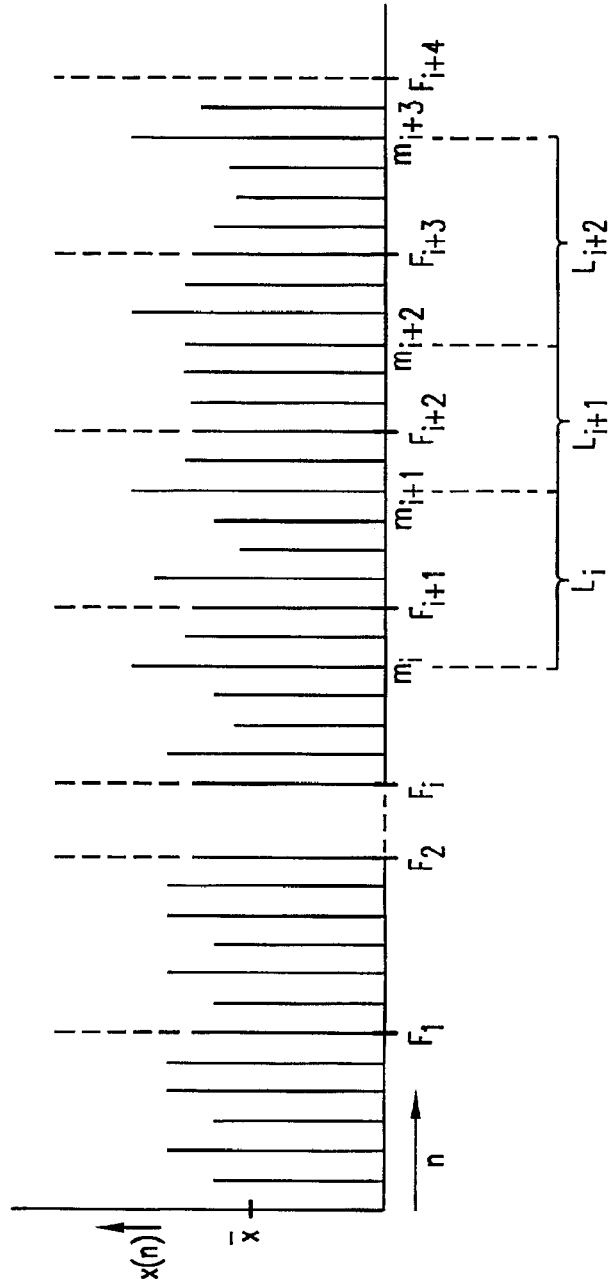
FIG. 2 shows a graph depicting a train of signal samples generated by the embodiment of FIG. 1.

Referring to FIG. 2, there are shown signal samples x(n) respectively included in frames $F_1$, $F_2$ and $F_i$ ... $F_{i+4}$, where each frame is of length M as stated above. Moreover, it is to be emphasized that FIG. 2 shows only the samples x(n) of a frame which are equal to or greater than the average magnitude thereof, computed in accordance with Equation (1). Samples x(n) which are less than the average magnitude for a frame are disregarded, for reasons set forth hereafter. FIG. 2 further shows the maximum value of x(n) for frame $F_i$ occurring at $n=m_i$, that is, $m_i$ is the maximum value index of frame $F_i$. Thus, $x(m_i)$ is a signal peak for frame $F_i$. Similarly, frames $F_{i+1}$ ... $F_{i+3}$ have signal peaks at $n=m_{i+1}$ ... $m_{i+3}$, respectively.

The term quasi-pitch (Q_pitch), as used herein, is the period between adjacent signal peaks. Thus, in FIG. 2 $m_{i+1}-m_i$ is the Q_pitch period $L_i$ between signal peaks $x(m_i)$ and $x(m_{i+1})$. In the invention, it has been recognized that if successive Q_pitch periods have similar lengths or values over a number of frames, this is an indication of a sustained pitch contained in a voice signal. It has been recognized further that by detecting the signal peaks of successive frames, it becomes possible to provide a comparatively simple yet effective, technique to continually monitor the audio signal for the presence of speech. Accordingly, VAD 10 of FIG. 1 is further shown provided with a peak detection and Q_pitch period computation component 18. Component 18 is coupled to receive the signal samples x(n) and also to receive the average magnitude $\overline{X}$ for successive signal frames.

Figure 3:
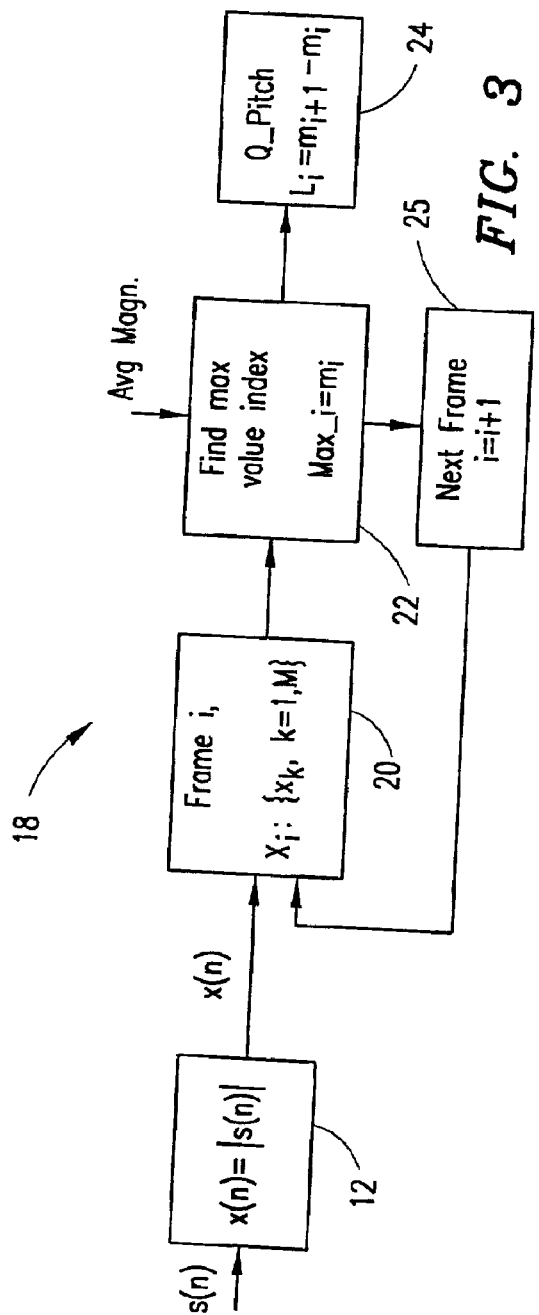
FIG. 3 is a flow chart illustrating operation of the embodiment shown in FIG. 1.

Referring to FIG. 3, there are shown several process blocks depicting operation of computation component 18 in detecting the value of a Q_pitch period associated with the signal samples x(n) of the frame $F_i$. Process block 20 receives respective samples x(n) from component 12, which preprocesses audio signal s(n) as described above to provide x(n). For the $i^{th}$ frame, block 20 provides the vector $X_i$ which comprises respective samples $x_k$ of frame $F_i$, k=1 ... M. The respective samples are coupled to process block 22, which also receives the average magnitude (Avg Magn.) computed for frame $F_i$ by component 16.

Process block 22 compares each received x(n) sample with the average magnitude computed for the $i^{th}$ frame, and selects only the samples which are equal to or greater than the average magnitude. The remaining samples, those which are less than the average magnitude, are disregarded Moreover, process block 22 functions to compare the values of respective samples x(n) received thereby with one another. The results of such comparison provide max x(n), that is, the signal sample of maximum value or magnitude for the $i^{th}$ frame, which is the signal peak for the frame as stated above. It will be seen that by disregarding all signal samples which are less than average magnitude $\overline{X}$, the processing task which must be carried out by block 22 is significantly simplified. Clearly, all such signals of lesser value are irrelevant to a process which seeks to identify the sample of maximum value. Identifying the sample x(n) of maximum value also identifies the max value index mi thereof. Thus, max $x(n)=x(m_i)$ for the $i^{th}$ frame.

Referring further to FIG. 3, there is shown max value index mi furnished to process block 24, which computes Q-pitch period $L_i$ from the quantity $(m_i-m_{i-1})$, wherein $L_{i-1}=(m_{i+1} - m_i)$. $m_{i+1}$ is the max index value for the signal peak of the frame $F_{i+1}$, which immediately follows frame $F_i$. After $L_i$ for frame $F_i$ has been determined, function block 25 of computation component 18 updates component 20 to receive respective samples for frame $F_{i+1}$ to proceed with computation of $L_{i+1}$, the value of the next—following Quasi_pitch period.

Referring again to FIG. 1, there is shown VAD 10 provided with a decision block 26 coupled to receive respective Q_pitch periods from computation component 18, as well as average magnitudes respectively determined by block 16. Decision block 26 operates in accordance with the principles set forth above, to detect successive Q_pitch periods having similar values over a number of frames. More specifically, decision block 26 is provided with specific criteria. For example, block 26 may be set up to conclude that a succession of Q_pitch periods indicate the presence of a speech component whenever the calculated Q_pitch periods for 5 successive frames remain close in value to each other within a tolerance limit of +/−8 samples. Thus, when decision block 26 detects this condition from input Q_pitch period values, it generates a logic 1 flag to denote the presence of a voice or speech component in the audio signal. Otherwise, block 26 generates a logic 0 to indicate a silent condition.

Usefully, block 26 is further constructed to determine whether successively received average magnitude values are above or below a specified threshold. In such embodiment, if a succession of average magnitude values are below the threshold, block 20 will conclude that speech is not present and generate a logic 0 flag notwithstanding successive Q-pitch periods which meet the above criteria.

Figure 4:
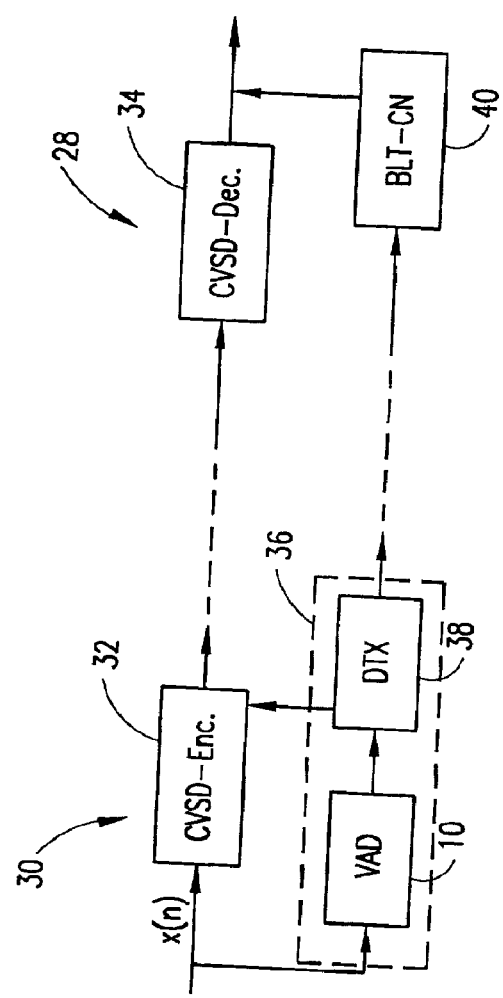
FIG. 4 is a block diagram showing the embodiment of FIG. 1 incorporated into an air interface.

Referring to FIG. 4, there is shown an air interface for signal transmissions, which comprises a receiver 28 and a transmitter 30 incorporating VAD 10. Transmitter 30 is provided with a Continuously Variable Slope Deltamodulation encoder (CVSD-enc.), usefully of 64 kb/s, which is used to implement the voice encoder algorithm. Receiver 28 is provided with a corresponding CVSD decoder 34.

Transmitter 30 is further provided with a DTX mechanism 36, comprising VAD 10 and a DTX component 38 responsive to the flag generated by decision block 26 of VAD 10. Thus, DTX enables transmission to occur when a flag 1 is produced, indicating a speech present or voice condition. The DTX discontinues transmission when a flag 0 is produced, indicating a speech absent or silent condition. Moreover, the DTX uses the VAD flag to extract silent or background information for use at the receiver 28. At the receiver, a comfort noise generator (BLT-CN) 40 uses this information to generate a noise signal similar to that which occurs during periods of silence. The comfort noise replaces the voice decoder output during periods of silence.

Obviously, other modifications and variations of the present invention are possible in light of the above teachings. It is therefore to be understood that within the scope of the disclosed concept, the invention may be practiced otherwise than as specifically described.

What is claimed is:

1. A method for detecting the presence of a speech component in an audio signal comprising the steps of:

processing said audio signal to produce a train of signal samples;

grouping a selected number of said signal samples into each of a succession of frames;

determining a signal peak of each of the frames by identifying, in each of the frames, a signal sample having a greatest magnitude;

deriving a spacing between the signal peaks of two adjacent frames to provide the value of a quasi-pitch period corresponding to said two adjacent frames; and comparing the values of selected quasi-pitch periods with one another to determine whether the speech component is present in said signal.

2. The method of claim 1 wherein:

said comparing step comprises determining whether or not the values of a specified number of adjacent quasi-pitch periods are all within a pre-specified limit.

3. The method of claim 1 wherein said method further comprises:

computing the average magnitude of the samples for a given frame; and computing the signal peak for said given frame only from samples thereof which are equal to or greater than said average magnitude.

4. The method of claim 1 wherein:

said processing step includes a selected pre-processing operation disposed to reduce the number of samples which are required to represent said signal.

5. The method of claim 4 wherein:

said pre-processing operation comprises applying an absolute value function to said signal.

6. The method of claim 4 wherein:

said pre-processing operation comprises applying half wave rectification to said signal.

7. The method of claim 2 wherein:

said pre-specified limit comprises a specified number of said samples.

8. Apparatus for detecting the presence of a speech component in an audio signal comprising:

a processor for receiving said audio signal and producing a train of signal samples;

a component for computing respective values of successive quasi-pitch periods associated with said train of samples by grouping a selected number of said samples into each of a succession of frames, determining a signal peak of each of the frames by identifying, in each of the frames, a signal sample having a greatest magnitude and deriving a spacing between the signal peaks of each two adjacent frames; and a component for comparing the values of selected quasi-pitch periods with one another to determine whether the speech component is present in said signal.

9. The apparatus of claim 8 wherein:

said comparing component is disposed to determine whether or not the values of a specified number of adjacent quasi-pitch periods are all within a pre-specified limit.

10. The apparatus of claim 8 wherein:

said computing component is disposed to compute the average magnitude of the samples for a given frame and to compute the signal peak for said given frame only from samples thereof which are equal to or greater than said average magnitude.

11. The apparatus of claim 8 wherein:

said processor is disposed to perform a selected preprocessing operation to reduce the number of samples required to represent said signal.

12. The apparatus of claim 11 wherein:

said pre-processing operation comprises applying an absolute value function to said signal.

13. The apparatus of claim 11 wherein:

said pre-processing operation comprises applying half wave rectification to said signal.

14. The apparatus of claim 9 wherein:

said pre-specified limit comprises a specified number of said samples.

* * * * *

UNITED STATES PATENT AND TRADEMARK OFFICE
CERTIFICATE OF CORRECTION

PATENT NO. : 6,876,965 B2  Page 1 of 1
DATED : April 5, 2005
INVENTOR(S) : Fisseha Mekuria It is certified that error appears in the above-identified patent and that said Letters Patent is hereby corrected as shown below:

Column 3,
Line 56, replace "index mi furnished" with -- index $m_i$ furnished --.

Signed and Sealed this

Sixteenth Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,876,965 B2
DATED : April 5, 2005
INVENTOR(S) : Fisseha Makuria

It is certified that error appears in the above-identified patent and that said Letters Patent is hereby corrected as shown below:

Column 3,
Line 56, replace "index mi furnished" with -- index $m_i$ furnished --.

Column 5,
Line 28, replace "number of said samples" with -- number of said signal samples --.

Signed and Sealed this

Fifteenth Day of November, 2005

JON W. DUDAS
*Director of the United States Patent and Trademark Office*